United States Patent [19]

Drori

[11] Patent Number: 4,753,731

[45] Date of Patent: Jun. 28, 1988

[54] MULTIPLE-DISC TYPE FILTERS

[76] Inventor: Mordeki Drori, 89 Zahal Street, Kiron, Israel

[21] Appl. No.: 4,236

[22] Filed: Jan. 5, 1987

Related U.S. Application Data

[63] Continuation of Ser. No. 709,375, Mar. 7, 1985, abandoned.

[30] Foreign Application Priority Data

Apr. 27, 1984 [IL] Israel ............................................ 71674

[51] Int. Cl.$^4$ ............................................... B01D 29/46
[52] U.S. Cl. ................................... 210/492; 210/488
[58] Field of Search ................. 210/330, 331, 345, 488, 210/492

[56] References Cited

U.S. PATENT DOCUMENTS

| | | | |
|---|---|---|---|
| 1,643,299 | 9/1927 | Furness | 210/488 |
| 1,804,512 | 5/1931 | Pickard | 210/492 |
| 2,455,486 | 12/1948 | Hicks | 210/492 |
| 2,554,016 | 5/1951 | Czarnecki | 210/492 |
| 2,631,732 | 3/1953 | Vocelka | 210/492 |
| 2,654,440 | 10/1953 | Robinson | 210/492 |
| 2,847,126 | 8/1958 | Goodman | 210/411 |
| 2,978,108 | 4/1961 | Strassheim | 210/488 |
| 3,005,556 | 10/1961 | Jensen | 210/488 |
| 3,473,668 | 10/1969 | Bunyard | 210/492 |
| 3,622,003 | 11/1971 | Czech | 210/488 |
| 3,648,843 | 3/1972 | Pearson | 210/488 |
| 3,666,107 | 5/1972 | Boggs | 210/488 |
| 4,115,274 | 9/1978 | Boddeker | 210/346 |
| 4,156,651 | 5/1979 | Mehondar | 210/108 |
| 4,267,045 | 5/1981 | Hoof | 210/322 |

FOREIGN PATENT DOCUMENTS

| | | | |
|---|---|---|---|
| 1157258 | 12/1957 | France | 210/488 |
| 62288 | 3/1983 | Israel | 210/488 |
| 687967 | 2/1953 | United Kingdom | 210/488 |
| 1096739 | 12/1967 | United Kingdom | 210/488 |

Primary Examiner—Ernest G. Therkorn
Attorney, Agent, or Firm—Cushman, Darby & Cushman

[57] ABSTRACT

Disclosed are a plurality of cooperating filter discs defining a plurality of paired cooperating filter surfaces, including a first surface having a large surface area and a second surface contacting only a portion of the large surface area of the first and leaving portion of the large surface area or the upstream side of the stack not contacted thereby, at least one of said first and second surfaces being formed with grooves at the areas at which the first and second surfaces contact to allow for the accumulation of particles.

16 Claims, 2 Drawing Sheets

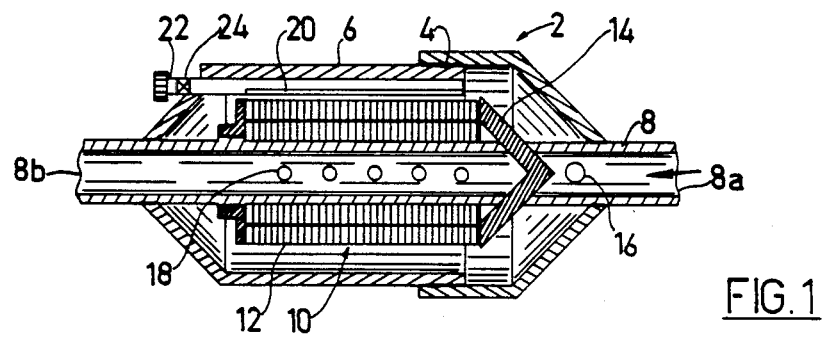
FIG. 1
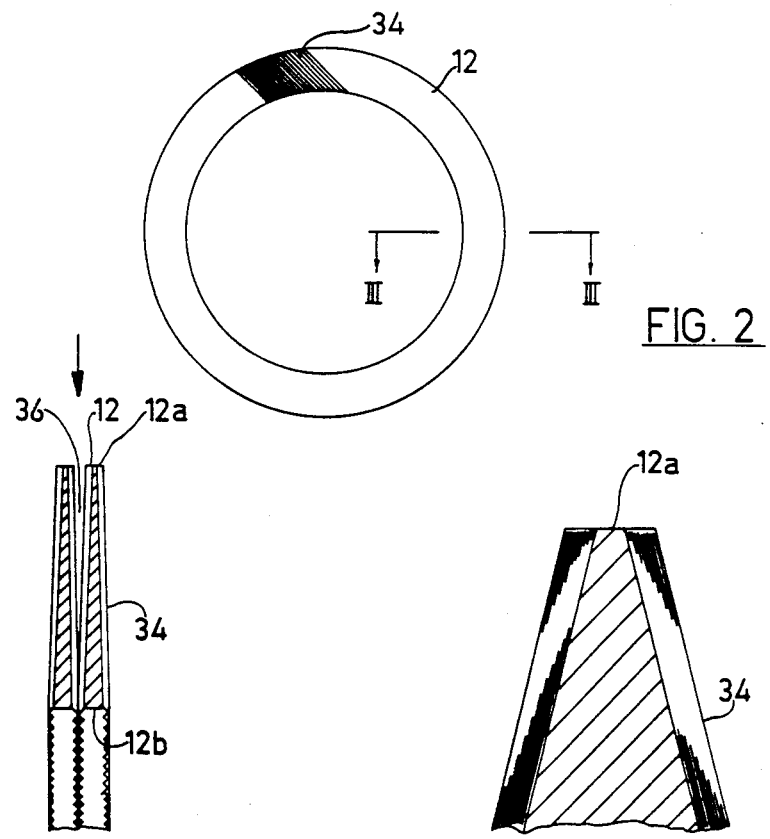
FIG. 2
FIG. 3
FIG. 3a

MULTIPLE-DISC TYPE FILTERS

This a continuation of application Ser. No. 709,375, filed Mar. 7, 1985, which was abandoned upon the filing hereof.

The present invention relates to multiple-disc type filters, such as are now widely used in a number of different applications for removing foreign particles, such as dirt, from a fluid, such as irrigation water.

Briefly, the multiple-disc type filter includes a housing having an inlet connectable to a downstream pipe; and a stack of filter discs disposed within the housing and formed with grooves side faces effective to separate foreign particles from the fluid flowing between the filter discs from the upstream side of the stack to the downstream side. Usually, the filter discs are of annular configuration, and the fluid flows in a radial direction through the stack, either radially inwardly if the outer surface of the stack faces the housing inlet, or radially outwardly if the inner surface of the stack faces the housing inlet. Cleaning the filter can be done manually by opening the filter housing and rinsing the discs with a water spray, or automatically by including a backwash nozzle which is automatically made operative by a differential-pressure device sensing the pressure drop across the stack of filter discs.

Multiple-disc filters have a number of important advantages over other types of filters, such as the apertured screen type. One important advantage is the higher quantities of foreign particles which the multiple-disc type filter is capable of removing and retaining as compared to the apertured-screen filter. Another advantage is the higher resistance to rupture that the multiple-disc filter has compared to the apertured-screen filter.

An object of the present invention is to provide a multiple-disc filter which is capable of removing and retaining even larger quantities of foreign particles, before cleaning is required, than the conventional multiple-disc filters not in use.

According to a broad aspect of the present invention, there is provided a filter including a housing having an inlet connectable to an upstream pipe, and an outlet connectable to a downstream pipe; and a stack of filter discs disposed within the housing and formed with grooved surfaces along their side faces effective to separate foreign particles from the fluid flowing between the filter discs from the upstream side of the stack to the downstream side thereof; characterized in that the thickness of each of the filter discs is smaller at its upstream side than at its downstream side, and/or the depth of their grooves is larger at the upstream side than at the downstream side, such that the upstream side of the stack of filter discs is formed with pockets between adjacent discs, in addition to said grooves, for receiving and holding foreign particles separated from the fluid.

In one described embodiment, the thickness of each of the filter discs increases uniformly from its upstream side to its downstream side; and in a second described embodiment, the depth of the grooves of each filter disc decreases uniformly from its upstream side to its downstream side.

A further embodiment of the invention is described wherein at least some of the discs are provided with serrated edges along their upstream sides to further increase the volume of the pockets formed in the disc stack.

In the described embodiments, the discs are of annular configuration, and therefore the pockets formed in the stack are also of annular configuration.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of filter constructed in accordance with the present invention.

FIG. 2 illustrates one of the discs in the filter of FIG. 1;

FIG. 3 is an enlarged sectional view, along lines III—III of FIG. 2, and

FIG. 3a is a further enlarged view of one of the discs in FIG. 3;

FIG. 4a is an enlarged view thereof corresponding to FIG. 3a;

DESCRIPTION OF THE PREFERRED EMBODIMENTS

Figures 4, 5, 6:
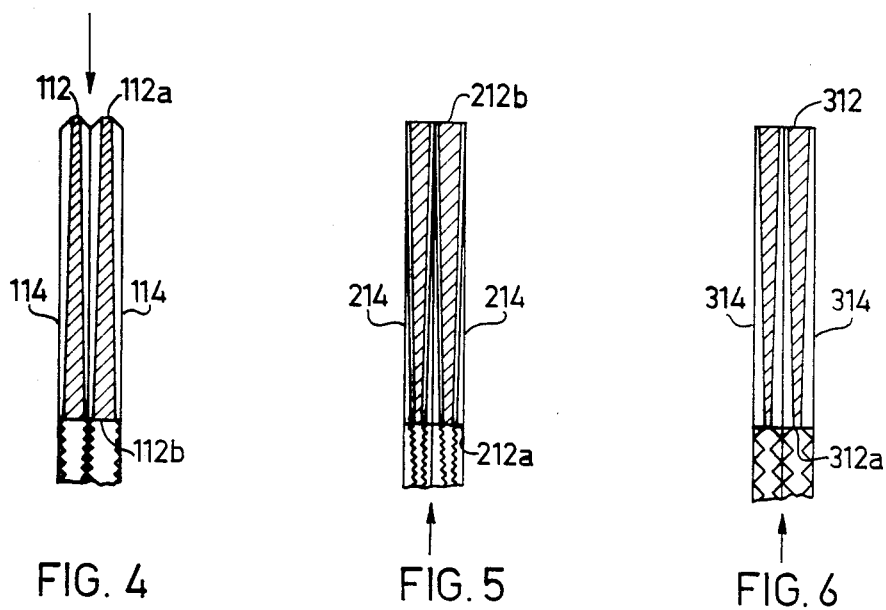
FIG. 4 is a view corresponding to that of FIG. 3 illustrating a modification in the construction of the filter discs.
FIGS. 5 and 6 are sectional views corresponding to that of FIG. 3, but illustrating further modifications in the disc construction.

The filter illustrated in FIG. 1 is an in-line filter adapted to be coupled directly to a supply pipe of a water irrigation system. The filter includes a housing, generally designated 2, constituted of two outer housing sections 4 and 6 threadedly connected together, and an inner tubular section 8. One end 8a of the latter section constitutes the inlet to the filter and is adapted to be coupled to the upstream supply pipe, and the opposite end 8b constitutes the outlet from the filter and is adapted to be coupled to the downstream supply line.

A filter body, generally designated 10, is disposed within housing 6 and is constituted of a plurality of annular filter discs 12 (FIG. 2) in stacked arrangement with the side faces of adjacent discs contacting each other for filtering the water (or other fluid) flowing through the housing inlet 8a to the outlet 8b. To constrain the water to flow through this path, the tubular housing section 8 is provided with: a conical deflector 14 at its inlet end 8a; a first plurality of openings 16 on the inlet side of this deflector; and a second plurality of openings 18 on the outlet side of this deflector. The water flowing into inlet 8a of the housing is thus forced to flow through the stack of filter discs 12 in the radially-inward direction, i.e., from the outer face to the inner face of the discs, before the filtered water reaches the outlet openings in the tubular housing section 8.

The filter illustrated in FIG. 1 may further include a backwash nozzle 20 connected to a dirt-purging outlet conduit 22 via a valve 24. Whenever the filter has to be cleaned, valve 24 is opened, either manually or automatically by a differential-pressure sensor sensing the pressure drop across the filter body, to cause the dirt particles separated from the water by the filter stack 10 to be backwashed through the nozzle 20 and out through the dirt-purging outlet 22. During such a backwash operation relative movement is effected between the filter stack 10 and the backwash nozzle 20, either by rotating, the filter stack 10 with respect to the backwash nozzle 20, or by rotating the backwash nozzle 20 with respect to the filter stack 10.

The foregoing general construction may also be used for simpler filters not having a backwash nozzle or other cleaning means, such filters being cleaned by opening the housing and flushing the filter discs 12 by a water spray. Although the invention could be used with the backwash type filter illustrated in FIG. 1, it is contemplated that most applications of the invention will be in the simple, manually-cleaned filter not including a backwash nozzle, since the main purpose of the invention is to increase the quantity of the dirt particles which the filter is capable of removing and retaining before cleaning (particularly manual cleaning) of the filter is required.

FIGS. 3 and 3a illustrate one construction of the filter discs 12 for this purpose. In this construction, the thickness of each filter disc is smaller at its upstream surface than at its downstream surface, such that when the discs 12 are arranged to form the stack 10 (FIG. 1), the upstream (outer in this case) surface of the stack defines annular pockets between adjacent discs for receiving and holding foreign particles separated from the fluid (e.g. water).

Each of the filter discs 12 is formed on its opposite side faces with a plurality of grooves 34. As shown in FIG. 2, grooves 34 are slanted at an angle (e.g., from 45°–60°) with respect to the radial line through the disc. The grooves 34 on the opposite side faces of the disc are slanted at the same angle but in the opposite direction, as known in filters in this type. As shown particularly in FIGS. 3 and 3a, the grooves 34 are of substantially uniform depth from the upstream (outer) side 12a of the disc to the downstream (inner) side 12b of the disc 12b. However, the thickness of the upstream side 12a of the disc is relatively small and increases uniformly to the downstream side 12b. Thus, when a plurality of discs are stacked together, they define, between each pair of contacting discs, an annular pocket 36 of relatively large depth at the upstream side 12a of the discs, and decreasing in depth towards the downstream sides 12b. The overall capacity of the stack discs, for removing and retaining dirt particles from the fluid being filtered, is therefore substantially increased by these annular pockets 36, as compared to the conventional disc construction wherein the removed dirt particles are retained either within the grooves 34 or on the outer face of the disc stack.

Preferably, the overall thickness of the downstream end 12b of each disc 12 is at least twice that of its upstream end 12a. As one example, the overall thickness of each disc 12 at its upstream end 12a may be a 0.5 mm., wherein the grooves on the opposite faces are each 0.2 mm. in depth and the nongrooved intermediate section is 0.1 mm.; and the downstream side 12b of each disc may have an overall thickness of 1.0 mm.; wherein the grooves 34 on each face are still 0.2 mm. in depth, and the nongrooved intermediate section is 0.6 mm.

Figure 4A:
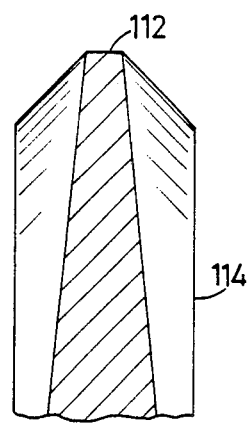

FIGS. 4 and 4a illustrate another construction of the filter discs, therein designated 112, wherein the grooves 114 on the opposite side faces uniformly decreases in depth from the upstream sides 112a of the discs towards their downstream side 112b. In this case, it is preferred that the depth of each groove at the upstream side of the disc be at least twice that at the downstream side. As one example, the grooves 114 on each side face of the discs 112 may have a depth of 0.4 mm. at its upstream side 112a uniformly decreasing to a depth of 0.2 mm. at its downstream side 112b. In this example, the thickness of the ungrooved intermediate section of the disc is 0.2 mm. at its upstream side so that its overall thickness at its upstream side is 1.0 mm.; and the thickness of the ungrooved intermediate section of the disc is 0.6 mm at its downstream side 112b so that the overall thickness of the downstream side of the groove is also 1.0 mm. Thus, when a plurality of such discs are stacked together, as shown in FIG. 1, the varying-depth grooves 114 define annular pockets between each pair of adjacent discs for receiving and holding substantial quantities of foreign particles separated from the fluid being filtered.

FIGS. 5 and 6 illustrate arrangements similar to FIGS. 3 and 4, respectively, but wherein the fluid flows in the opposite direction through the filter stack, i.e., radially outwardly rather than radially inwardly. Such constructions would be used when the fluid is inletted into the center of the stack, so that the upstream surfaces of the filter discs are at the inner sides, as shown at 212a and 312a, respectively, in FIGS. 5 and 6, the outer sides of the filter discs being thereby the downstream sides through which the clean fluid exits, as shown at 212b and 312b in FIGS. 5 and 6, respectively. Otherwise, FIG. 5 is of the same construction as illustrated in FIGS. 3 and 3a, wherein the grooves 214 on the opposite side faces of the discs are of uniform depth, the nongrooved sections of the discs varying in thickness; and the construction illustrated in FIG. 6 is the same as in FIG. 4, wherein the depths of the grooves 314 decreases uniformly from the upstream sides 312a of the discs to their downstream sides 312b.

Figure 7:
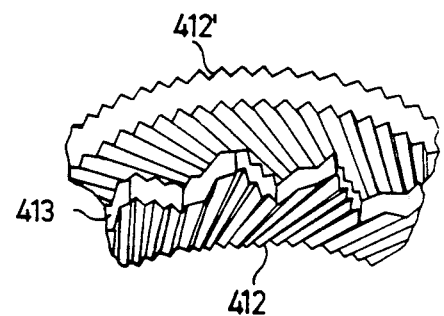
FIG. 7 is a fragmentary three-dimensional view illustrating a further modification in the construction of the filter discs.

FIG. 7 illustrates a still further arrangement that may be used in order to further increase the dirt-removing and dirt-holding capacity of the filter. The modification illustrated in FIG. 7 accomplishes this by having at least some of the discs, preferably every other disc, formed with serrated edges along their upstream surfaces to define additional pockets for removing and retaining dirt particles, FIG. 7 illustrates only the upstream sides of two discs, therein designated 412 and 412', wherein it will be seen that disc 412 is provided with serrated edges 413 along its upstream side, whereas the next adjacent disc 412' is not. The discs illustrated in FIG. 7 may be otherwise of the same constructions as described above wth respect to any of FIGS. 3–6.

While the invention has been described with respect to several preferred embodiments, it will be appreciated that many other variations, modifications, and applications of the invention may be made.

What is claimed is:

1. A filter including a housing having an inlet connectable to an upstream pipe, and an outlet connectable to a downstream pipe; and a stack of non-porous filter discs of annular configuration disposed within the housing and formed with grooved surfaces along their side faces effective to separate foreign particles from the fluid flowing between said filter discs from the upstream side of the stack to the downstream side thereof, said grooved surfaces defining grooves extending generally radially from the upstream side to the downstream side; wherein the thickness of each of said filter discs is smaller at its upstream side than at its downstream side, and the depth of their grooves varies uniformly by decreasing from a larger depth at the upstream side to a shallower depth at the downstream side, said varying-depth grooves defining on the upstream side of the stack of filter discs annular pockets between adjacent discs, extending from the upstream side and communicating via said varying-depth grooves with the downstream side, for receiving and holding foreign particles separated from the fluid.

2. The filter according to claim 1, wherein the thickness of each of said filter discs increases uniformly from its upstream side to its downstream side.

3. The filter according to claim 2, wherein the thickness of each of said filter discs at its downstream side is at least twice its thickness at its upstream side.

4. The filter according to claim 2, wherein the thickness of each of said filter discs at its downstream side is at least twice its thickness at its upstream side.

5. The filter according to claim 2, wherein the depth of the grooves at the upstream side of the filter disc is at least twice that of the depth at the downstream side of the filter disc.

6. The filter according to claim 2, wherein the depth of the grooves at the upstream side of the filter disc is at least twice that of the depth at the downstream side of the filter disc.

7. The filter according to claim 2, wherein at least some of the discs are formed with serrated edges along their upstream sides to further increase the volume of said pockets formed between adjacent discs of the stack.

8. The filter according to claim 2, wherein at least some of the discs are formed with serrated edges along their upstream sides to further increase the volume of said pockets formed between adjacent discs of the stack.

9. The filter according to claim 1, wherein the thickness of each of said filter discs at its downstream side is at least twice its thickness at its upstream side.

10. The filter according to claim 9, wherein at least some of the discs are formed with serrated edges along their upstream sides to further increase the volume of said pockets formed between adjacent discs of the stack.

11. The filter according to claim 1, wherein the depth of the grooves at the upstream side of the filter disc is at least twice that of the depth at the downstream side of the filter disc.

12. The filter according to claim 11, wherein at least some of the discs are formed with serrated edges along their upstream sides to further increase the volume of said pockets formed between adjacent discs of the stack.

13. The filter according to claim 1, wherein at least some of the discs are formed with serrated edges along their upstream sides to further increase the volume of said pockets formed between adjacent discs of the stack.

14. The filter according to claim 13, wherein alternate discs of the stack are formed with said serrated edges on their upstream sides.

15. A filter according to claim 1, wherein the outer edges of said annular discs constitute said upstream side of the discs.

16. The filter according to claim 1, wherein the inner edges of said annular discs constitute said upstream sides of the discs.

* * * * *